(12) United States Patent
Van Nieuwenhuyze et al.

(10) Patent No.: US 11,373,077 B2
(45) Date of Patent: Jun. 28, 2022

(54) CONFIGURATION OF A TRANSACTION IN A CONTACTLESS ELECTRONIC DEVICE

(71) Applicants: STMicroelectronics (Rousset) SAS, Rousset (FR); Proton World International N.V., Diegem (BE)

(72) Inventors: Olivier Van Nieuwenhuyze, Wezembeek-Oppem (BE); Jean-Marc Grimaud, Biot (FR)

(73) Assignees: STMICROELECTRONICS (ROUSSET) SAS, Rousset (FR); PROTON WORLD INTERNATIONAL N.V., Diegem (BE)

( * ) Notice: Subject to any disclaimer, the term of this patent is extended or adjusted under 35 U.S.C. 154(b) by 0 days.

(21) Appl. No.: 17/127,240

(22) Filed: Dec. 18, 2020

(65) Prior Publication Data

US 2021/0192306 A1    Jun. 24, 2021

(30) Foreign Application Priority Data

Dec. 23, 2019 (FR) ..................................... 1915472

(51) Int. Cl.
| | |
|---|---|
| *G06K 7/08* | (2006.01) |
| *G06K 19/07* | (2006.01) |
| *G06Q 20/32* | (2012.01) |
| *G06K 7/10* | (2006.01) |
| *G06Q 20/34* | (2012.01) |

(Continued)

(52) U.S. Cl.
CPC ..... *G06K 19/0723* (2013.01); *G06K 7/10297* (2013.01); *G06Q 20/326* (2020.05); *G06Q 20/3224* (2013.01); *G06Q 20/3278* (2013.01); *G06Q 20/352* (2013.01); *G06Q 20/3574* (2013.01); *H04L 41/0803* (2013.01); *H04L 69/329* (2013.01); *G06K 19/07775* (2013.01); *G06Q 20/321* (2020.05)

(58) Field of Classification Search
CPC ........... G06K 19/0723; G06K 7/10297; G06Q 20/326; G06Q 20/3574
USPC ....................................................... 235/451
See application file for complete search history.

(56) References Cited

U.S. PATENT DOCUMENTS

| | | | |
|---|---|---|---|
| 10,223,628 | B2 | 3/2019 | Van Nieuwenhuyze et al. |
| 2006/0052055 | A1 | 3/2006 | Rowse et al. |

(Continued)

FOREIGN PATENT DOCUMENTS

| | | |
|---|---|---|
| CN | 102194085 A | 9/2011 |
| CN | 102460521 A | 5/2012 |

(Continued)

*Primary Examiner* — Ahshik Kim
(74) *Attorney, Agent, or Firm* — Seed IP Law Group LLP

(57) ABSTRACT

A method of configuring a contactless communication device is provided. The contactless communication device includes integrated circuits hosting at least two applications compatible with different communication protocols or the same communication protocol and using different communication parameters and a contactless communication circuit. The method includes stopping, by the contactless communication circuit, the transmission of answers of the contactless communication device to requests transmitted by a proximity coupling reader during a transaction initiated by the reader to cause the initiation by the reader of a new transaction.

20 Claims, 2 Drawing Sheets

(51) Int. Cl.
*H04L 41/0803* (2022.01)
*H04L 69/329* (2022.01)
*G06K 19/077* (2006.01)

(56) References Cited

U.S. PATENT DOCUMENTS

| | | | |
|---|---|---|---|
| 2010/0251261 A1* | 9/2010 | Diallo | G07F 7/0866 |
| | | | 719/313 |
| 2011/0320557 A1* | 12/2011 | Takeuchi | H04W 4/50 |
| | | | 709/213 |
| 2012/0178365 A1 | 7/2012 | Katz et al. | |
| 2017/0255925 A1 | 9/2017 | Van Nieuwenhuyze et al. | |
| 2018/0005223 A1* | 1/2018 | Terra | G06Q 20/352 |
| 2019/0357044 A1* | 11/2019 | Park | H04W 12/086 |

FOREIGN PATENT DOCUMENTS

| | | |
|---|---|---|
| CN | 103477358 A | 12/2013 |
| CN | 106033983 A | 10/2016 |
| CN | 107147986 A | 9/2017 |
| EP | 2 365 676 A1 | 9/2011 |
| EP | 3 214 582 A1 | 9/2017 |

\* cited by examiner

CONFIGURATION OF A TRANSACTION IN A CONTACTLESS ELECTRONIC DEVICE

BACKGROUND

Technical Field

The present disclosure generally concerns electronic devices and, more specifically, contactless communication electronic devices. The present disclosure more specifically aims at the selection of a communication mode between a contactless communication terminal and a contactless communication device.

Description of the Related Art

The development of applications usable in contactless communications, between a proximity coupling device (PCD), for example, a contactless terminal (Contactless Reader), and a contactless electronic device, for example, a cell phone equipped with the near-field communication technology (NFC) generates new difficulties.

In particular, communications comply with evolving standards, which may raise problems of compatibility between different generations of devices.

Further, contactless electronic devices are more and more often capable of hosting a plurality of applications having different security levels. For example, a cell phone may host a bank application, for example, according to the EMV (Eurocard-Mastercard-Visa) standard, and other so-called proprietary applications, for example, access control, transport, and the like applications.

Such different applications may require or otherwise rely on different protocols. Usual systems are based on a detection, by the reader, of the capacity of the contactless electronic device to communicate according to one standard or another. However, this generates false rejections, that is, a contactless electronic device which would be capable of communicating with a reader is refused by said reader.

BRIEF SUMMARY

It would be desirable to have a solution for verifying the compatibility of a contactless electronic device for a communication with a proximity coupling device.

An embodiment provides a method of configuring a contactless communication device comprising integrated circuits hosting at least two applications compatible with different communication protocols or the same communication protocol and using different communication parameters and a contactless communication circuit, wherein the contactless communication circuit stops the transmission of answers of the contactless communication device to requests transmitted by a proximity coupling reader during a transaction initiated by the reader to cause the initiation by the reader of a new transaction.

According to an embodiment, the contactless communication circuit comprises a memory in which is stored, for each application, a configuration for a contactless communication comprising at least one identifier of the communication protocol with which the application is compatible. The contactless communication circuit transmits to the reader data of one of the configurations during a transaction initiated by the reader, and the contactless communication circuit changes the configuration used at the new transaction initiated by the reader.

According to an embodiment, the configuration which is used by the contactless communication circuit at the new transaction initiated by the reader depends on the current date.

According to an embodiment, the configuration which is used by the contactless communication circuit at the new transaction initiated by the reader depends on the time.

According to an embodiment, the configuration which is used by the contactless communication circuit at the new transaction initiated by the reader depends on the frequency of use of each configuration.

According to an embodiment, the configuration which is used by the contactless communication circuit at the new transaction initiated by the reader depends on the position of the contactless communication device.

According to an embodiment, the configurations are ordered according to a determined sequence and the configuration which is used by the contactless communication circuit at the new transaction initiated by the reader corresponds to the configuration which, according to said sequence, follows the last configuration used by the contactless communication circuit.

According to an embodiment, the contactless communication circuit is configured to detect an interruption of a transaction initiated by the reader.

According to an embodiment, one of the applications is compatible with the ISO 14443-4 protocol and another one of the applications is compatible with the ISO 14443-3 protocol.

According to an embodiment, one of the applications is a EMV application.

According to an embodiment, one of the applications is a MIFARE Classic or MIFARE Classic+ application.

An embodiment also provides a contactless communication electronic device comprising integrated circuits hosting at least two applications compatible with different communication protocols or compatible with the same communication protocol and using different communication parameters and a contactless communication circuit comprising a microprocessor programmed for the implementation of the method such as described hereabove.

According to an embodiment, the contactless communication electronic device corresponds to a cell phone.

According to embodiments of another described aspect:
  a method of configuring a contactless communication device comprises integrated circuits hosting at least two applications compatible with different communication protocols or compatible with the same communication protocol and using different communication parameters and a contactless communication circuit, the contactless communication circuit being configured to detect an interruption of a transaction initiated by a proximity coupling reader;
  the contactless communication circuit comprises a memory in which are stored, for each application, a configuration for a contactless communication comprising at least one identifier of the communication protocol with which the application is compatible and the contactless communication circuit transmits to the reader data of one of the configurations during a transaction initiated by the reader;
  the number of answers to be transmitted by the contactless communication circuit to requests from the reader in an initial phase of the transaction is stored in the contactless communication circuit, the contactless communication circuit detecting an interruption of the transaction initiated by the reader when the number of answers is smaller than the stored number;

the contactless communication circuit detects an interruption of the transaction initiated by the reader when the last control signal sent by the reader causes the delivery by the contactless communication circuit to the reader of an answer indicating an error;

the transaction comprises the implementation of an anticollision process by the reader and the contactless communication circuit determines that the transaction has been interrupted if it has not received a control signal expected from the reader during the anticollision process;

the contactless communication circuit determines that the transaction has been interrupted if it detects that the reader no longer emits an electromagnetic field;

the contactless communication circuit detects an interruption of the transaction initiated by the reader by detecting that the reader repeatedly transmits the same request of detection of the presence of the contactless communication device;

the contactless communication circuit detects an interruption of the transaction initiated by the reader by detecting the absence of transmission of a control signal by the reader for a determined time period;

when an interruption of the transaction is detected, the contactless communication circuit changes the configuration used at the next transaction initiated by the reader;

one of the applications is compatible with the ISO 14443-4 protocol and another one of the applications is compatible with the ISO 14443-3 protocol;

one of the applications is a EMV application;

one of the applications is a MIFARE Classic or MIFARE Classic+ application;

a contactless communication electronic device comprising integrated circuits hosting at least two applications compatible with different communication protocols or compatible with the same communication protocol and using different communication parameters and a contactless communication circuit comprising a microprocessor programmed for the implementation of the method such as previously defined; or the contactless communication electronic device corresponds to a cell phone.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties. For the sake of clarity, only the operations and elements that are useful for an understanding of the embodiments described herein have been illustrated and described in detail. In particular, the exchanges between the proximity coupling device and a contactless electronic device once the communication has been established have not been detailed, the described embodiments being compatible with usual exchanges.

Unless specified otherwise, the expressions "around", "approximately", "substantially" and "in the order of" signify within 10%, and preferably within 5%.

The embodiments are described by taking as an example a contactless electronic device, for example, a cell phone or a connected watch, and a contactless reader forming a proximity coupling device (PCD). Further, although reference is made to payment applications, the described embodiments transpose to applications of different natures, provided that they generate the same issues and that they are compatible with the described solutions.

Figure 1:
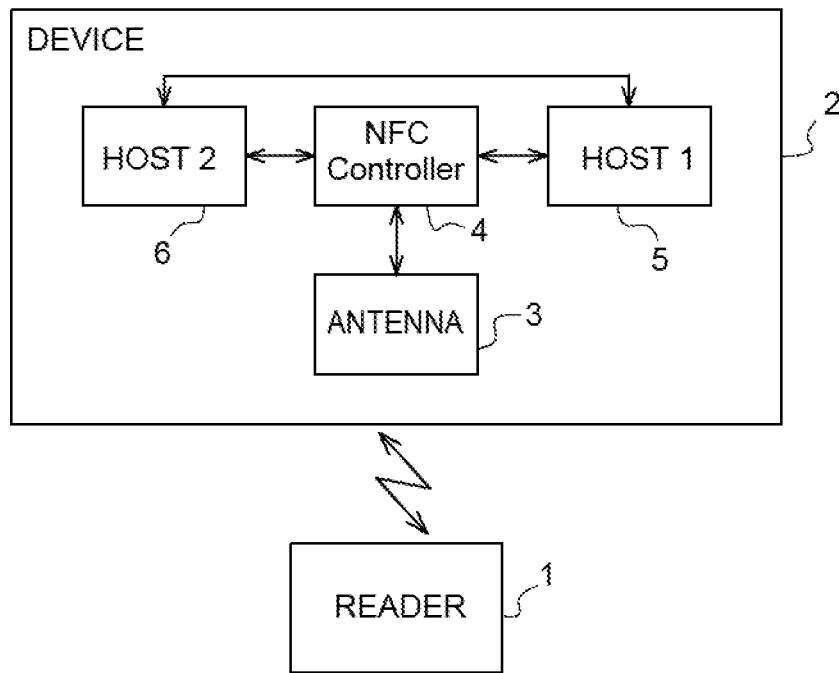
FIG. 1 very schematically shows an embodiment of a near-field communication system.

FIG. 1 very schematically shows an example of a contactless communication system of the type to which the described embodiments apply.

A contactless communication terminal 1 or contactless reader (READER) generates an electromagnetic field. A contactless electronic device 2 (DEVICE) located within the range of the reader detects the field and is then capable of exchanging information with reader 1.

Contactless electronic device 2 comprises an antenna 3 (ANTENNA) configured to exchange electromagnetic signals with reader 1. Contactless electronic device 2 further comprises an integrated circuit 4 (NFC Controller), called NFC controller hereafter, configured to control antenna 3 for the transmission of electromagnetic signals to reader 1 and to convert the signals delivered by antenna 3 into digital signals usable by NFC controller 4 or by other integrated circuits of device 2. NFC controller 4 is in particular configured to exchange data with reader 1, on the initiative of reader 1, for the establishing of a communication with reader 1.

Contactless electronic device 2 further comprises integrated application circuits 5, 6 (HOST 1, HOST 2), each configured to exchange signals with NFC controller 4. Each application circuit 5, 6 is capable of exchanging data with reader 1 via the NFC controller 4 and antenna 3 according to a contactless communication protocol when a communication has been established between NFC controller 4 and reader 1. Application circuits 5, 6 may possibly be configured to directly exchange data with each other. As an example, one of application circuits 5, 6 may correspond to a universal integrated circuit card (UICC). As an example, one of application circuits 5, 6 may correspond to an embedded or integrated secure element (ESE or ISE). As an example, when contactless electronic device 2 is a cell phone, one of application circuits 5, 6 may correspond to the application processor of the phone. As an example, when contactless electronic device 2 is a cell phone, one of application circuits 5, 6 may correspond to the application processor of the phone. The common point between each application circuit 5, 6 is that they are connected to NFC controller 4 and that they are capable of hosting an application capable of executing a transaction initiated by reader 1.

Contactless communication protocols used by integrated circuits 5 and 6 may be "proprietary", that is, set by the manufacturer, or standardized. Contactless device 2 may be multi-applications, that is, it hosts applications which use different contactless communication protocols. As an example, integrated circuit 5 may implement a bank application which uses a so-called EMV technology, which uses protocols based on ISO standard 14443-4, and integrated circuit 6 may implement one or a plurality of applications which use a technology known under denomination MIFARE. The MIFARE technology uses, in certain implementations, an (application) communication protocol which does not support the ISO 14443-4 protocol or requires specific parameters which should be used during the anticollision. The application which should be initiated by contactless device 2 depends on the reader 1 with which it communicates. Indeed, reader 1 is generally dedicated to an application (for example, bank, transport, access control, etc.) and the activation of contactless device 2 in the field of reader 1 depends on the protocol accepted by the contactless device 2.

The steps enabling to establish a contactless communication between contactless device 2 and reader 1, also called steps of activation of contactless device 2, are generally only carried out by NFC controller 4, particularly to limit the duration of the activation. For this purpose, NFC controller 4 comprises a memory having the different configurations capable of being used by NFC controller 4 stored therein. A configuration comprises all the information necessary to NFC controller 4 to establish a contactless communication with reader 1 according to a determined protocol. As an example, when contactless device 2 comprises an integrated circuit hosting a EMV application and an integrated circuit hosting a MIFARE application, at least two different configurations are stored in the NFC controller. More than one configuration may be associated with an integrated circuit when the integrated circuit hosts at least two applications using different communication protocols. As an example, an integrated circuit may host an application using the MIFARE Classic protocol and an application using the MIFAR DESFire protocol. According to another example, application circuits 5, 6 may host applications compatible with the same communication protocol. However, at least certain parameters of the configurations associated with the two applications may then be different, for example, key values used during the communication.

Figure 2:
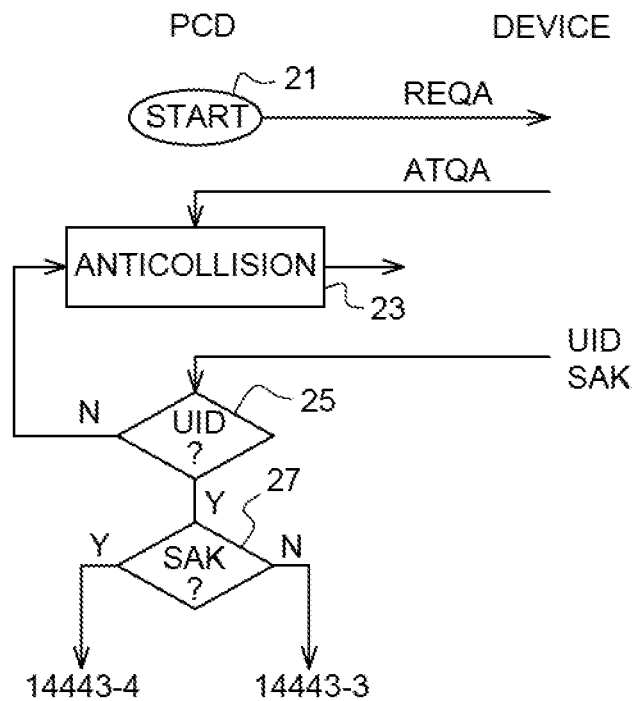
FIG. 2 is a simplified block diagram of an example of configuration of a proximity coupling device.

FIG. 2 is a block diagram illustrating steps of a sequence of activation of a contactless electronic device in the field of a PCD reader.

The PCD reader emits, periodically or when it detects (block 21, START) the presence of a load in the field that it generates, a request (REQA) intended for the contactless devices DEVICE possibly present in the field. If a contactless device present in the field interprets request REQA, it sends an acknowledgement message ATQA. On reception of such a message, the reader starts a so-called anticollision procedure (block 23, ANTICOLLISION) to make sure that it communicates with a single contactless device. Such a procedure includes the sending, by the contactless device, of a UID identifier of the device and of a SAK (Select AcKnowledge) code identifying the application hosted by the contactless device and with which it answers. The SAK code or SAK value determines the communication protocol accepted by the contactless device. The reader verifies whether identifier UID is complete (block 25, UID?). If it is not (output N of block 25), the anticollision procedure carries on until a complete identifier is received. If it is (output Y of block 25), the reader reads the SAK code to determine the protocol of communication with the contactless device. Typically, in applications targeted by the present disclosure, the PCD reader determines (block 27, SAK?) whether the device is compatible (output Y of block 27) with the 14443-4 or (output N of block 27) 14443-3 protocol. The previously-described configuration data particularly comprise the SAK value for each configuration.

Each previously-described configuration may comprise a value SAK. According to an embodiment, the SAK values may be delivered to the NFC controller by the application circuits for the determination of the configurations by the NFC controller. According to an embodiment, for an application circuit 5, 6 hosting an EMV application, the SAQ value may be 0x20. According to an embodiment, for an application circuit 5, 6 hosting a MIFARE application, the SAQ value may be 0x08. According to an embodiment, for an application circuit 5, 6 hosting both an EMV application and a MIFARE Classic application, the NFC controller may determine three possible configurations with different SAQ values, one configuration indicating the hosting of two EMV and MIFARE Classic applications (SAQ value 0x28), one configuration indicating the hosting of the EMV application (SAQ value 0x20), and one configuration indicating the hosting of the MIFARE Classic application (SAQ value 0x08). The determination of the configurations by the NFC controller may take into account the parameters delivered by the assembly of application circuits 5, 6.

The upcoming of multi-application contactless devices and particularly containing both an integrated circuit hosting a EMV-type bank application and an integrated circuit hosting a MIFARE Plus type application generates issues.

The MIFARE technology has different security levels SL0 to SL3 according to the generation of the integrated circuit. More particularly, a MIFARE Classic (SL1 mode) or MIFARE Classic+ (SL2 mode) application is compatible with the ISO 14443-3 protocol. A MIFARE Plus (SL3) application is compatible with the ISO 14443-4 protocol. Further, advanced MIFARE Plus applications are retro-compatible. Thus, a MIFARE Plus application may also operate under lower security levels, to be compatible with existing readers. Similarly, a reader hosting MIFARE Plus applications is generally capable of operating according to lower protocols (MIFARE Classic or Classic+).

To benefit from the advantages of the most recent protocols and particularly of the MIFARE Plus protocol, a reader hosting a MIFARE Plus application first attempts to establish a communication according to this protocol. Thus, in the presence of a contactless device in its field, it attempts to establish a communication according to the ISO 14443-4 protocol. If the contactless device answers, this means that it is compatible with the MIFARE Plus technology and the communication starts. If the contactless device does not answer, the reader switches to a lower-level MIFARE Classic protocol and communicates according to the 14443-3 standard.

However, in the presence of a contactless device hosting an EMV application and a MIFARE Classic application, the communication cannot be established, while the contactless device is compatible with the reader. Indeed, when the communication is to be established, the NFC controller answers that it accepts the 14443-4 protocol since the contactless device hosts an EMV application. The reader then starts the communication in MIFARE Plus mode. However, the contactless device does not answer since its MIFARE application is not compatible with the MIFARE Plus technology. One then is in a situation where the contactless device which could have communicated with the reader in MIFARE Classic (or Classic+) mode is prevented from communicating since it hosts an EMV application.

In fact, the contactless device does not recognize the nature of the transaction (for example, EMV or MIFARE Plus) before it receives specific control signals linked to the application. Now, a MIFARE Plus reader starts by adapting the transaction to the highest-performance protocol (MIFARE Plus) before sending specific control signals to the application. This results, for contactless devices hosting an EMV application and a MIFARE application, but which are not compatible with MIFARE Plus, in a failure of the transaction even though the reader and the contactless device are compatible with the MIFARE Classic technology.

Figure 3:
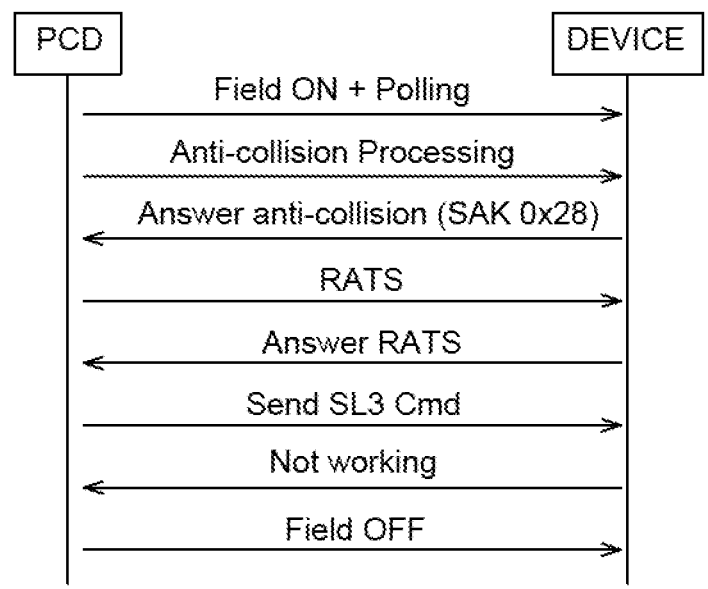
FIG. 3 illustrates the establishing of a near-field communication according to a MIFARE Plus protocol.

FIG. 3 very schematically illustrates the rejection of a transaction by a MIFARE Plus reader in such a situation.

The reader (PCD) turns on (Field ON) the field (activates the field generation) and periodically sends (Polling) a request (REQA, FIG. 2). The NFC controller of the contactless device (DEVICE) answers and an anticollision process starts. Since the contactless device hosts an EMV application, the NFC controller answers (Answer anti-collision) with a SAK value compatible with ISO standard 14443-4. For a contactless device hosting an EMV and MIFARE Classic application, the delivered SAK value is for example 0x28. On reception of the answer, the reader sends a standardized request of the ISO 14443-4 standard called RATS (Request for Answer to Select) enabling to switch to the MIFARE Plus mode if the NFC controller answers or to remain in MIFARE Classic mode in the opposite case. Since the contactless device hosts an EMV application, the NFC controller answers (Answer RATS) this request of the 14443-4 standard. The reader then starts a MIFARE Plus transaction with security level SL3 (Send SL3 Cmd). However, the NFC controller of the contactless device remains mute (Not working) or returns an error (for example, by mentioning an unknown control signal) since the MIFARE application of the contactless device is not compatible with this security level. The reader then turns off the field (Field OFF) or keeps on periodically sending the request sent at the first step of the transaction.

While the previously described techniques are based on a detection by the reader, the inventors provide modifying the operation on the NFC controller side to solve the above-discussed situation and to enable a contactless device hosting a level-SL1 or -SL2 MIFARE card to communicate with a MIFARE Plus reader despite the fact that it also hosts an EMV application.

Figure 4:
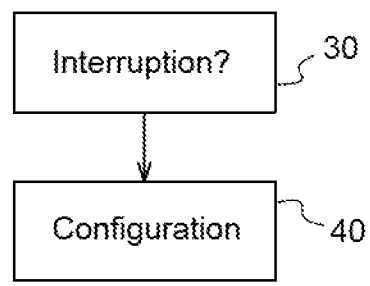
FIG. 4 is a simplified diagram of an embodiment of a method of configuring a proximity coupling device.

FIG. 4 very schematically illustrates an embodiment of a proximity transaction configuration method. The method comprises a step 30 (Interruption?) of detection by the NFC controller of an interruption of the transaction with the reader and a step 40 (Configuration) of modification of the configuration used by the NFC controller at the next establishing of a communication. Step 40 forces the NFC controller (during the reconfiguration) not to or to no longer answer the reader (PCD). Given the lack of communication, the reader will restart its detection loop (as previously described). When the NFC controller is reconfigured, it may answer again requests from the reader, which causes a new establishing of the communication, but, from the viewpoint of the reader, a new card/target is presented.

At step 30, the NFC controller of the contactless device determines whether a transaction has been interrupted before the end of the establishing of a communication with the reader. For such a determination, the NFC controller determines whether a first condition is fulfilled and, possibly, whether a second condition is fulfilled.

According to an embodiment, the NFC controller comprises a memory into which is stored, for each configuration, the expected number of messages exchanged between the NFC controller and the reader after the anticollision process according to the communication protocol associated with this configuration so that the establishing of the communication is successful. The exchanged messages comprise the requests emitted by the reader and the responses sent by the NFC controller after the anticollision process or the establishing of the communication. Each message may correspond to a data unit of the application protocol or APDU (Application Protocol Data Unit). As an example, for a communication protocol compatible with the ISO 14443-3 standard (MIFARE Classic), the number of expected exchanged messages is equal to 3 and for a communication protocol compatible with the ISO 14443-4 standard (EMV), the expected number of exchanged messages is equal to 4.

According to a first condition, the NFC controller determines that the transaction has been interrupted if the number of answers transmitted by the NFC controller to the reader is smaller than the number of expected responses stored in the memory. In particular, in the case where the transaction is interrupted just after the anticollision process, the number of responses sent by the NFC controller to the reader may be zero.

According to another first condition, the NFC controller determines that the transaction has been interrupted if the last control signal sent by the reader on establishing of the communication causes the delivery by the NFC controller to the reader of an answer indicating an error. As an example, for an APDU under format ISO7816-4, a correct response is indicated by 0x9XXX, X being a hexadecimal value, and an error is often indicated by 0x6XXX, X being a hexadecimal value.

According to another first condition, the NFC controller determines that the transaction has been interrupted if it has not received a control signal expected from the reader during the anticollision process. As an example, the NFC controller determines that the transaction has been interrupted if it does not receive request RATS from the reader.

According to a second condition, the NFC controller determines that the transaction has been interrupted if it detects that the reader has stopped the emission of an electromagnetic field.

According to another second condition, the NFC controller determines that the transaction has been interrupted if it detects that the reader returns to the detection mode. The detection mode may correspond to the periodic transmission by the reader of the same request emitted at the beginning of the establishing of the communication or of the wake-up control signal (WUP). The control signal is sent "in a loop" until the contactless device no longer answers thereto.

According to another second condition, the NFC controller determines that the transaction has been interrupted if it detects that the reader returns to the polling mode. The polling mode may correspond to the periodic emission by the reader of the same request emitted at the beginning of the establishing of the communication.

According to another second condition, the NFC controller determines that the transaction has been interrupted if it has not received a control signal transmitted by the reader for a predetermined time period, for example, for 200 ms.

At step 40, the NFC controller selects the new configuration which will be used at the next establishing of a communication by the reader and which is different from the configuration which has been used at the last establishing of a communication by the reader.

At step 40, the NFC controller further turns off the antenna of the contactless device, which means that it no longer answers to requests from the reader. Thereby, the reader no longer detects the presence of the contactless device in the electromagnetic field and returns to the polling mode. The NFC controller may select the next configuration while the antenna of the contactless device is off.

According to an embodiment, the configurations are ordered according to a sequence determined in the memory of the NFC controller and the new configuration which is selected by the NFC controller corresponds to the configuration which, according to said sequence, follows the last configuration used by the NFC controller.

The selection of the new configuration by the NFC controller may implement at least one of the following selection criteria:

the current date;

the time;

the frequency of use of each configuration, for example, daily or weekly; and/or the position of the contactless device, when the contactless device has geolocation data, for example, delivered by a geolocation unit contained in the contactless device, particularly a GPS (Global Positioning System) geolocation unit.

The current date and/or time criterion may be used by the NFC controller to select as a new configuration the configuration corresponding to a transport application, for example, when the current date corresponds to a day from Monday to Friday, or when the time is within time ranges corresponding to usual transport hours between home and the workplace.

For the frequency criterion, the NFC controller is configured, for each configuration, to store the frequency at which this configuration has been used in a successful transaction. The NFC controller may select as a new configuration the configuration which is most compatible with the stored usage frequencies.

According to an embodiment, the position criterion of the contactless device may be used by the NFC controller to select as a new configuration the configuration corresponding to a payment application when the position of the contactless device coincides with the stored position of a reader for a payment application. According to another example, the position criterion of the contactless device may be used by the NFC controller to select as a new configuration the configuration corresponding to a transport application when the position of the contactless device coincides with the stored position of a location where readers for a transport application are present, for example, the underground, a railway station, etc.

If the NFC controller has had to change the configuration since it had detected that the transaction had failed with the previous configuration, it will send the received messages/control signals to the application circuit 5, 6 which hosts the application for which the configuration has been activated. If the configuration allows the use of an application on a plurality of application circuits, the NFC controller will be based on existing routing modes.

The above-described embodiment is implemented on the contactless device side and is transparent for the reader (it requires no modification on the reader side). The contactless devices thus formed (programmed) are thus compatible with existing readers.

Various embodiments have been described. Various alterations, modifications, and improvements will occur to those skilled in the art. In particular, although the embodiments have been more specifically described in relation with examples of application to EMV and MIFARE bank transactions, they transpose to other applications and memories where similar problems are posed. Further, the practical implementation of the described embodiments is within the abilities of those skilled in the art based on the functional indications given hereabove and by using or by programming circuits usual per se.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of configuring a contactless communication device comprising integrated circuits hosting at least two applications compatible with different communication protocols or the same communication protocol and using different communication parameters and a contactless communication circuit, the method comprising:

stopping, by the contactless communication circuit, a transmission of answers of the contactless communication device to requests transmitted by a proximity coupling reader during a transaction initiated by the reader to cause the initiation by the reader of a new transaction, wherein the contactless communication circuit comprises a memory in which is stored, for each application, a configuration for a contactless communication including at least one identifier of the communication protocol with which the application is compatible, the method further comprising:

transmitting, by the contactless communication circuit, to the proximity coupling reader data of one of the configurations during a transaction initiated by the reader; and changing, by the contactless communication circuit, the configuration used at the new transaction initiated by the reader, wherein the configuration which is used by the contactless communication circuit at the new transaction initiated by the reader depends on at least one of a frequency of use of each configuration or a position of the contactless communication device.

2. The method according to claim 1, wherein the configuration which is used by the contactless communication circuit at the new transaction initiated by the reader depends on the current date.

3. The method according to claim 1, wherein the configuration which is used by the contactless communication circuit at the new transaction initiated by the reader depends on the time.

4. The method according to claim 1, wherein the configuration which is used by the contactless communication circuit at the new transaction initiated by the reader depends on the frequency of use of each configuration.

5. The method according to claim 1, wherein the configuration which is used by the contactless communication circuit at the new transaction initiated by the reader depends on the position of the contactless communication device.

6. The method according to claim 1, wherein the configurations are ordered according to a determined sequence and wherein the configuration which is used by the contactless communication circuit at the new transaction initiated by the reader corresponds to a configuration which, according to the sequence, follows a last configuration used by the contactless communication circuit.

7. The method according to claim 1, further comprising:
detecting, by the contactless communication circuit, an interruption of the transaction initiated by the reader.

8. The method according to claim 1, wherein one of the applications is compatible with the ISO 14443-4 protocol and another one of the applications is compatible with the ISO 14443-3 protocol.

9. The method according to claim 1, wherein one of the applications is a Eurocard-Mastercard-Visa (EMV) application.

10. The method according to claim 1, wherein one of the applications is a MIFARE Classic or MIFARE Classic+ application.

11. A contactless communication electronic device, comprising:
a plurality of integrated circuits hosting at least two applications compatible with different communication protocols or compatible with the same communication protocol and using different communication parameters;
a memory in which is stored, for each application, a configuration for a contactless communication including at least one identifier of the communication protocol with which the application is compatible; and
a contactless communication circuit including a microprocessor configured to:
stop a transmission of answers of the contactless communication device to requests transmitted by a reader during a transaction initiated by the reader to cause the initiation by the reader of a new transaction,
transmit to the reader data of one of the configurations during a transaction initiated by the reader; and
change the configuration used at the new transaction initiated by the reader,
wherein the configurations are ordered according to a determined sequence and wherein the configuration which is used by the contactless communication circuit at the new transaction initiated by the reader corresponds to a configuration which, according to the sequence, follows a last configuration used by the contactless communication circuit.

12. The contactless communication electronic device according to claim 11, wherein the contactless communication electronic device is a cell phone.

13. The contactless communication electronic device according to claim 12, wherein one of the application circuits is an application processor of the cell phone.

14. The contactless communication electronic device according to claim 11, wherein the microprocessor is further configured to detect an interruption of the transaction initiated by the reader.

15. The contactless communication electronic device according to claim 11, wherein one of the applications is compatible with the ISO 14443-4 protocol and another one of the applications is compatible with the ISO 14443-3 protocol.

16. The contactless communication electronic device according to claim 11, wherein the configuration which is used by the contactless communication circuit at the new transaction initiated by the reader depends on a frequency of use of each configuration.

17. The contactless communication electronic device according to claim 11, wherein the configuration which is used by the contactless communication circuit at the new transaction initiated by the reader depends on a position of the contactless communication device.

18. A contactless communication electronic device, comprising:
a first integrated circuit hosting a Eurocard-Mastercard-Visa (EMV) application compatible with a first communication protocol;
a second integrated circuit hosting a MIFARE Classic or MIFARE Classic+ application compatible with a second communication protocol that is different from the first communication protocol, the second integrated circuit having different communication parameters than the first integrated circuit;
a memory in which is stored, for each application, a configuration for a contactless communication including at least one identifier of the communication protocol with which the application is compatible; and
a contactless communication circuit configured to:
stop a transmission of answers of the contactless communication device to requests transmitted by a reader during a transaction initiated by the reader to cause the initiation by the reader of a new transaction,
transmit to the reader data of one of the configurations during a transaction initiated by the reader; and
change the configuration used at the new transaction initiated by the reader,
wherein the configuration which is used by the contactless communication circuit at the new transaction initiated by the reader depends on at least one of a frequency of use of each configuration or a position of the contactless communication device.

19. The contactless communication electronic device according to claim 18, wherein the contactless communication circuit is further configured to detect an interruption of the transaction initiated by the reader.

20. The contactless communication electronic device according to claim 18, wherein the configurations are ordered according to a determined sequence and wherein the configuration which is used by the contactless communication circuit at the new transaction initiated by the reader corresponds to a configuration which, according to the sequence, follows a last configuration used by the contactless communication circuit.

* * * * *